(12) United States Patent
Wright et al.

(10) Patent No.: US 7,593,922 B1
(45) Date of Patent: Sep. 22, 2009

(54) METHOD AND SYSTEM FOR PROVIDING DELIVERY OF SEGMENTED DATA FILES

(75) Inventors: Robert Wright, Marietta, GA (US);
Barbara J. Roden, Atlanta, GA (US)

(73) Assignee: AT&T Intellectual Property, I. L.P., Wilmington, DE (US)

(*) Notice: Subject to any disclaimer, the term of this patent is extended or adjusted under 35 U.S.C. 154(b) by 379 days.

(21) Appl. No.: 10/696,109

(22) Filed: Oct. 29, 2003

Related U.S. Application Data (60) Provisional application No. 60/478,688, filed on Jun. 13, 2003.

(51) Int. Cl.
*G06F 17/30* (2006.01)
(52) U.S. Cl. .............. 707/3; 707/10; 707/205; 709/203; 709/209
(58) Field of Classification Search ......... 707/3, 707/10, 205; 709/203, 209
See application file for complete search history.

(56) References Cited

U.S. PATENT DOCUMENTS

| | | | |
|---|---|---|---|
| 6,415,373 B1 * | 7/2002 | Peters et al. | 711/167 |
| 6,486,892 B1 * | 11/2002 | Stern | 715/760 |
| 6,691,149 B1 * | 2/2004 | Yokota et al. | 709/201 |
| 6,757,691 B1 * | 6/2004 | Welsh et al. | 707/104.1 |
| 6,862,594 B1 * | 3/2005 | Saulpaugh et al. | 707/10 |
| 2004/0236785 A1 * | 11/2004 | Greiner | 707/104.1 |

FOREIGN PATENT DOCUMENTS

WO WO 02054708 A2 * 7/2002

OTHER PUBLICATIONS

Web page published by "Go.com"; http://web.archive.org/web/20020205122421/http://www.go.com/index.html; pp. 1-2.*
Source code for a web page published by "Go.com"; http://web.archive.org/web/20020205122421/http://www.go.com/index.html; pp. 1-18.*

* cited by examiner

*Primary Examiner*—Apu M Mofiz
*Assistant Examiner*—Monica M Pyo
(74) *Attorney, Agent, or Firm*—Cantor Colburn LLP (57) ABSTRACT

A method for providing delivery of segmented data files including a method for providing distributed delivery of segmented data files. The method includes receiving a request to send a data file to a target device. A directory is queried for one or more segments corresponding to the data file, where each of the segments includes a pointer to a data bundle located at one or more source locations. One of the source locations is selected for each of the segments. The data bundle from each of the selected source locations is transmitted to the target device.

21 Claims, 8 Drawing Sheets

METHOD AND SYSTEM FOR PROVIDING DELIVERY OF SEGMENTED DATA FILES

CROSS-REFERENCE TO RELATED APPLICATIONS

This application claims the benefit of U.S. provisional patent application Ser. No. 60/478,688, filed Jun. 13, 2003, the entire contents of which are incorporated herein by reference.

FIELD OF THE INVENTION

The present disclosure relates generally to a method of providing delivery of segmented data files and in particular, to a method of segmenting data files and tracking the locations of the segments through a network directory.

BACKGROUND OF THE INVENTION

Systems exist for distributing content to users such as broadcast television, cable television and pay-per-view. In such systems, the content provider dictates when content is available and the user may view the content at the scheduled time. Devices such as video cassette recorders (VCRs) and digital video recorders (DVRs) (e.g., a TiVo system) allow users to time-shift content and view the content at a time different from the broadcast time. There is increasing desire by users for content on demand. In such systems, users can immediately obtain multimedia (e.g., motion pictures). Such systems must address features such as billing, security and quality.

Systems and techniques currently exist for delivering data files (e.g., software, audio, video) to devices from a single source. Limitations of this approach include excessive network bandwidth utilization and excessive resource utilization at the source due to large files being delivered. In addition, sending a large file from a single source may result in significant impacts from source failures, including requiring one hundred percent retransmission of data. These limitations associated with delivering data files to a device from a single source may result in delays in the delivery and ultimately, availability of the data package at the destination device.

SUMMARY OF THE INVENTION

Embodiments of the invention include a method for providing distributed delivery of segmented data files. The method includes receiving a request to send a data file to a target device. A directory is queried for one or more segments corresponding to the data file, where each of the segments includes a pointer to a data bundle located at one or more source locations. One of the source locations is selected for each of the segments. The data bundle from each of the selected source locations is transmitted to the target device.

Additional embodiments include a system for providing delivery of segmented data files. The system includes a network and a data file accessible via the network. In addition, the system includes a directory that is accessible via the network. Further, the system includes a target device in communication with the network and a network element in communication with the network. The network element includes instructions to implement a method including receiving a request via the network to send the data file to the target device. The directory is queried via the network for one or more segments corresponding to the data file, where each of the segments includes a pointer to a data bundle located at one or more source locations. One of the source locations is selected for each of the segments. The data bundle from each of the selected source locations is transmitted via the network to the target device.

Further embodiments include a computer program product for providing delivery of segmented data files. The computer program product includes a storage medium readable by a processing circuit and storing instructions for execution by the processing circuit for performing a method including receiving a request to send a data file to a target device. A directory is queried for one or more segments corresponding to the data file, where each of the segments includes a pointer to a data bundle located at one or more source locations. One of the source locations is selected for each of the segments. The data bundle from each of the selected source locations is transmitting to the target device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF THE INVENTION

Exemplary embodiments of the present invention segment data files (i.e content) into smaller bundles and tag these bundles with unique identifiers. As these bundles are distributed to devices connected to various networks (e.g., wireless, wireline, broadband), their location is tracked in a network available directory. When the full package must be distributed to a new device, the directory is queried to locate available bundles. Intelligent agents then determine the best sources for distribution to the new device. These agents utilize rules to determine the best sources based on characteristics such as network topologies and source capabilities. The smaller bundles are then transmitted simultaneously from multiple sources to the new target.

This technique may result in a reduction in network bandwidth requirements, a reduction in the resource impact on each individual source, a reduction in the impact of failures at any individual source and a reduction in the total time to complete the distribution. Utilizing exemplary embodiments of the present invention may result in the data package being available for use on the new device in a shorter timeframe. Exemplary embodiments of the present invention may play a key role in architectures such as Asymmetric Digital Subscriber Line (ADSL) where available bandwidth for upload from the source device may be significantly lower than the download bandwidth to the target. Exemplary embodiments of the present invention also play a key role in peer-to-peer architectures where resource impacts must be minimized to source devices because they may belong to customers who have previously received the data file package.

Figure 1:
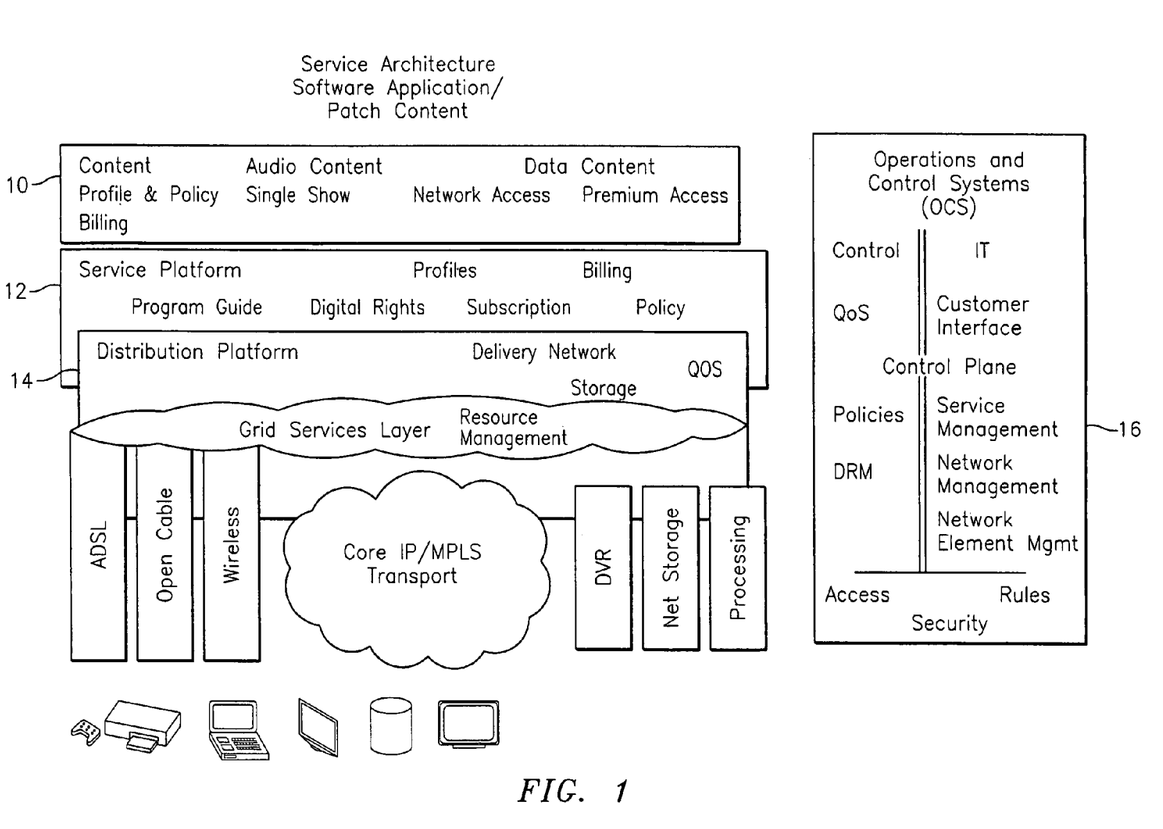
FIG. 1 is a block diagram of an exemplary system for distributing content to multiple users.

FIG. 1 is a block diagram of an exemplary architecture of a content distribution system for distributing content to multiple users. As shown in FIG. 1, content 10 from many sources is aggregated and distributed to many consumers based on profiles associated with the content and the consumer. The content 10 may be a variety of audio-visual multimedia, such as television programs, movies, software application/patch, audio and consumer-generated content.

A services platform 12 controls subscription management and billing functions. This layer supports a program guide, management of content, device and user profiles, digital rights and other security. The services platform 12 provides measurement tools to assess network performance, accounting, billing, logging, and other service control functions. This layer of the content distribution system 10 may be implemented using processor-based network elements such as computers at a central office and/or distributed processor-based network elements.

A distribution platform 14 manages aspects associated with delivering approved content to the end consumer. This includes management of resources such as bandwidth on the last mile loop, bandwidth within the edge and core network, content retrieval, caching policies and quality of service objectives. This layer of the content distribution system 10 may be implemented using processor-based network elements such as computers at a central office and/or distributed processor-based network elements.

A control layer 16 manages the end-end service including aspects of the underlying transport network, the underlying storage network, and the services functions. This layer of the content distribution system 10 may be implemented using processor-based network elements such as computers at a central office and/or distributed processor-based network elements.

A program guide in the service platform 12 allows the consumer to subscribe to and manage content 10. This includes identifying content that the consumer wishes to store based on particular shows or categories of interest. A simple intuitive interface supports content classification, searches, selections, etc. In addition to consumer-selected content, the service builds a profile of the consumer based on viewing patterns and preloads content that has a high likelihood of interest to the consumer.

The program guide interface also provides the consumer an interface into the billing system to allow the consumer to see charges associated with various content, current billing data, and account management.

Content 10 is managed through the relationships of a variety of profiles and policies defined within the content distribution system. The end consumer has a profile that defines the content that has been purchased by the consumer and additional content that may be purchased or perhaps specifically prevented. The content or programming also has a profile associated with it. This profile indicates the billing fees associated with the program and viewing rules such as number of times played, number of days available, etc. A device profile includes constraints on the display devices as some content may only be appropriate for devices capable of displaying digital broadcast quality video where other content can be displayed on lower quality devices.

The content distribution system manages to the intersection of the three profiles ensuring that the content is appropriate for the consumer, the consumer is willing to pay for the content, and that the content can be displayed on the consumer's viewing device. The content distribution system tracks the usage of the content and duration of the "rental" to ensure that the content owner is compensated.

In addition to managing the digital rights associated with the content, the services layer 12 communicates with the distribution layer 14 to ensure that storage and network QOS capabilities conform to agreements entered into with the content owner.

The control layer 16 provides support for the distribution platform 14 and employs many support components found in telecommunications delivery networks today. The functions defined in the Telecommunications Management Network Architecture are defined by the FCAPS model and are applied and extended to support the distribution platform 14.

One function provided by the control layer 16 is fault management. Fault management includes the functions required to identify and correct troubles within the content distribution system. This includes network outage reporting, service outage reporting, alarm surveillance, fault management, fault localization, restoration, automatic dispatch, and testing, as well as the processes and documentation associated with these functions.

Another function provided by the control layer 16 is configuration management. Configuration management includes network planning and engineering functions, installation and provisioning functions, service management and resource status. Most of the configuration management capabilities are found within a grid computing platform and focus on dynamic resource discovery and peer-to-peer resource negotiations. The grid computing platform is discussed in further detail herein.

Another function provided by the control layer 16 is account management. Account management focuses on collecting usage records, pricing strategies, billing and collections, and auditing. The content distribution system is capable of billing by the show, by premium packaged content, by network content, both for video-on-demand content and for subscription content. The content distribution system tracks data items such as the number of times the program was viewed and the number of days the program is available. Accounting is very closely linked to digital rights and security management functions. The accounting function covers both the consumer's use of content as well as settlements with content owners.

Another function provided by the control layer 16 is performance management. Performance management includes performance quality assurance, performance monitoring, and performance management control. The content distribution system supports performance management on a number of levels within the service. At the most basic level, the bandwidth across a consumer link (e.g., ADSL) is managed to control the quality of content delivery. This includes determining when to stream off-line content (e.g. video) and the number of active sessions that can be open. The content caching must be managed to ensure an optimal distribution of content to the consumer's storage device, the storage devices served out of the same central office, and other storage devices within the network.

Another function provided by the control layer 16 is security management. Security management secures both the content distribution network as well as the content. This function is tied to digital rights management. The content distribution system preserves rights of the content owners.

Figure 2:
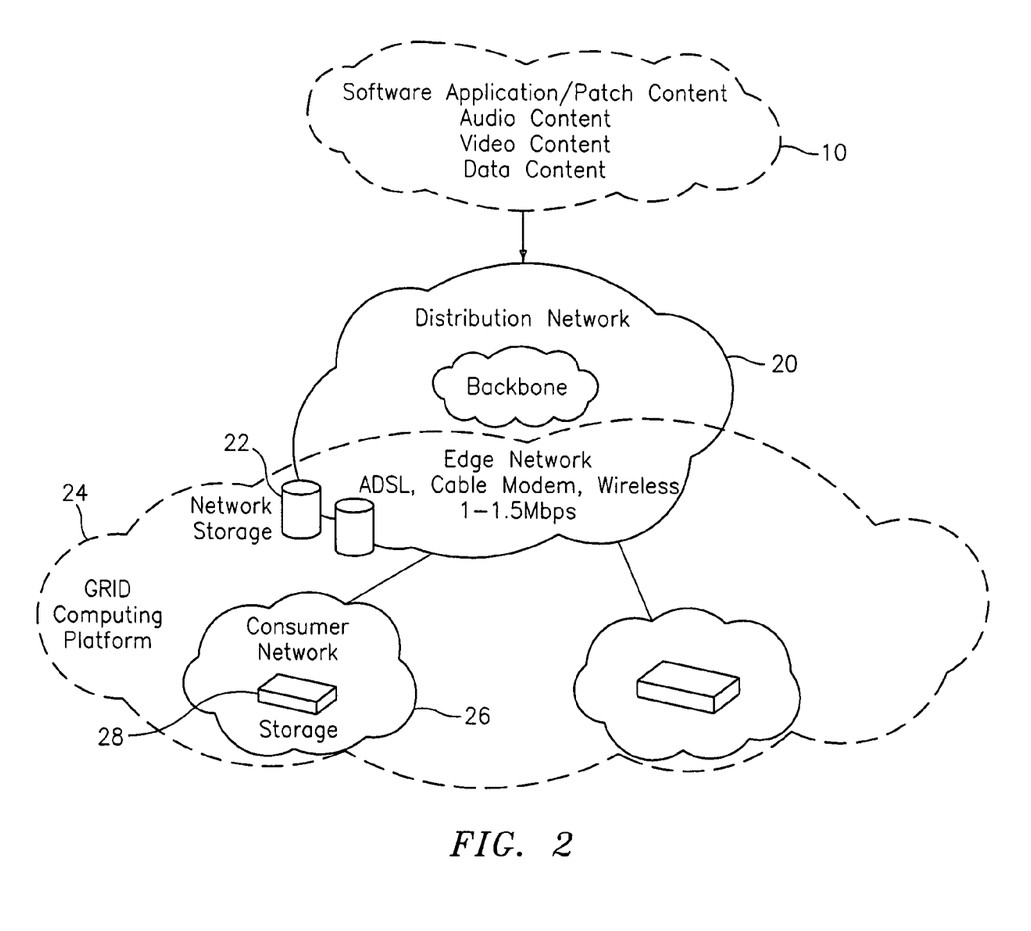
FIG. 2 depicts an exemplary content distribution architecture.

FIG. 2 depicts an exemplary content distribution architecture. The content distribution architecture includes the underlying network 20 and software infrastructure to support the service platform 12 discussed with reference to FIG. 1. The major components of the architecture include the content 10, the distribution network 20 (backbone and access), the storage network 22, the grid computing platform 24, and a consumer network 26. It is understood that the consumer network 26 is not limited to residential locations but may be any end user of the content. Content 10, or data files, may include any information that may transferred via a network including, but not limited to, software packages, software patches, software upgrades, audio files, video files, multi-media files and ASCII text files.

The content 10 is made available through a distribution agreement between the content distribution system provider and the content owner. There is a defined process for adding new content into the network and an associated profile including digital rights, subscription rules, quality of service (QOS), and billing rules. Content is stored within the network storage 22 as well as on consumer storage devices at the consumer sites.

The distribution network 20 includes the backbone and the edge network. An MPLS core provides the backbone network for content distribution. The core network interfaces with a variety of access network and access network technologies. This includes ADSL networks as well as an open cable networks, wireless networks (e.g., DSL), wireline networks, broadband networks and other access networks as required.

The distributed storage architecture includes storage within the distribution network at network storage devices 22, perhaps at a centralized locations (e.g., central offices) as well as storage devices 28 at the consumers' sites. The storage network supports transmission of realtime content that is archived for future viewing and supports the transportation of non-realtime content between storage devices (e.g., consumer-to-consumer).

The grid computing platform 24 controls components of the distribution network. The grid computing platform 24 is provided by network elements executing grid applications. As described in further detail herein, the grid computing platform 24 is implemented using processor based network elements at a central office, at edges of the network, at the consumer location, etc. This grid applications software controls resources within the network including processing, bandwidth, and storage. The grid computing platform 24 provides the core applications platform for managing content and customer profiles including digital rights, subscriptions, billing, monitoring, etc.

The consumer network 26 is the end user network that seamlessly unites all/any of the typical end-user's information appliances and devices as described in further detail with reference to FIG. 5. The consumer network 26 manages the receipt of content from the distribution network 20 and stores the content on a storage device 28. The consumer network 26 may be based on a wireless networking standard such as 802.11e.

Figure 3:
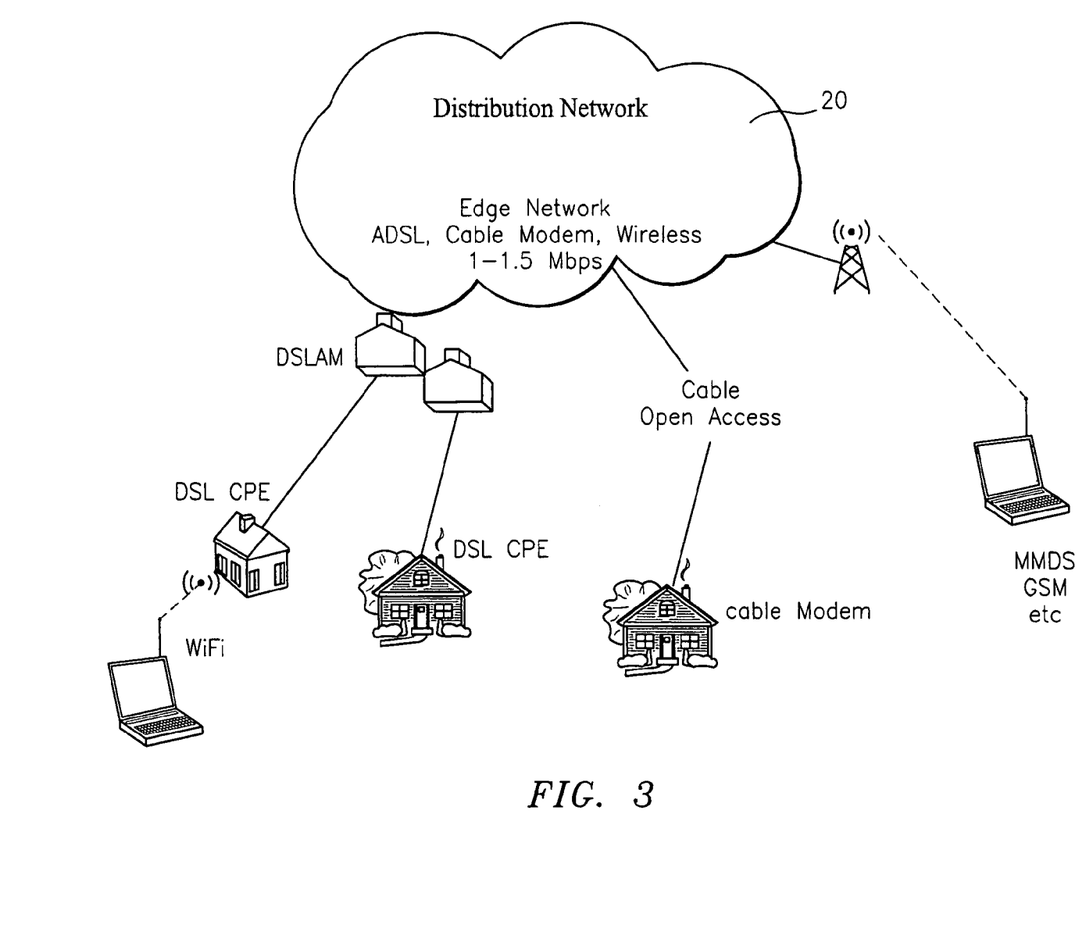
FIG. 3 depicts an exemplary distribution network in embodiments of the invention.

FIG. 3 depicts an exemplary distribution network 20 in an embodiment of the invention. The distribution network 20 provides for distributing content to a variety of consumers via a number of different channels. An ADSL link provides 1.5-3 Mbps downstream and 512 Kbps upstream. This allows 2-3 content streams to be delivered simultaneously over the downstream bandwidth. This may include a combination of actual realtime video and non-realtime content that is being preloaded on a consumer storage device 28. The upstream bandwidth is used to transfer stored programs from one consumer's storage device 28 to another consumer's storage device 28, preferably coupled to a common network element (e.g., the same central office). In addition, both the upstream and downstream links are used for management of the content distribution service.

As shown in FIG. 3, the distribution network 20 can also include other ADSL networks, open access cable, and/or a wireless DSL platform. The content distribution service could be offered over cable modem access. The network operator derives value from the content service and the content revenue stream, not from the underlying access network. Further, the network owner may only need access to the underlying network rather than own the network outright.

Figure 4:
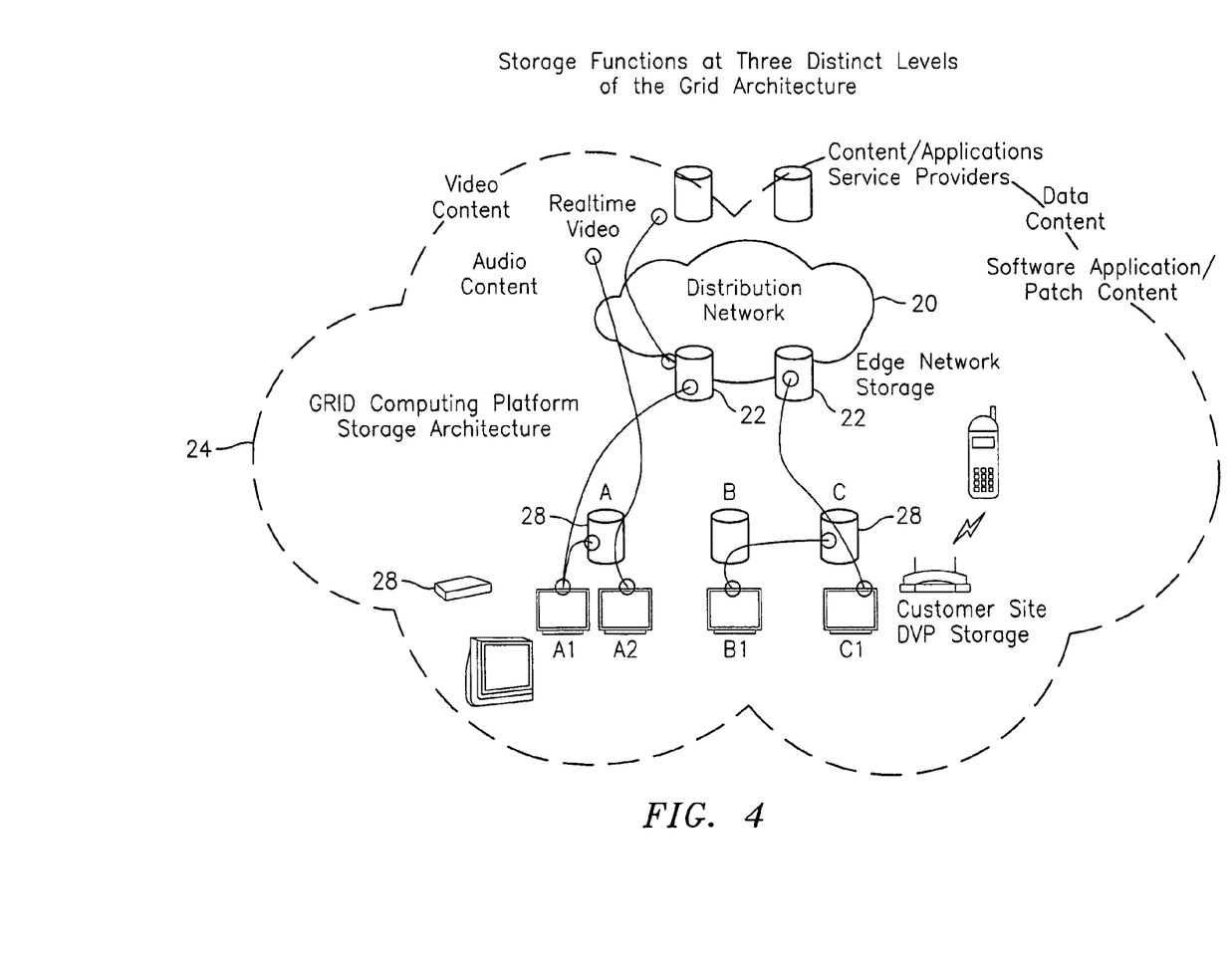
FIG. 4 depicts an exemplary grid computing platform in embodiments of the invention.

FIG. 4 depicts an exemplary grid computing platform 24 in an embodiment of the invention. The content distribution service platform is a very large scale distributed platform. The grid infrastructure is scaled to solve a number of issues: authentication, authorization, accounting, resource discovery, resource access, resource negotiation, compression/decompression, encoding/decoding, content caching, content discovery, content retrieval, quality of service, management mechanisms, and other challenges. The grid computing platform 24 monitors bandwidth consumption at the edge of the network 20 to determine whether an additional content stream can be delivered, to determine whether non-realtime content can be delivered to the consumer storage device 28, and whether the link can support upstream content delivery.

The grid computing platform 24 determines when and where to store non-realtime video and other data files. The grid computing platform 24 is implemented using distributed network elements such as controller 30 (e.g., set-top box), consumer storage devices 28 (which may be incorporated within controller 30), network storage devices 22 (e.g., at central office, data centers) and/or other network elements (e.g., processors at central office locations or other locations). These processor-based network element(s) determine, based on customer preference, customer viewing habits or other reasons, when to store a content on the consumer storage device 28. Processor-based network element(s) decide where to store content that is not resident on the user's local consumer storage device 28. The grid computing platform 24 understands the network relationship between users to optimize network resources when content must be distributed from one consumer's storage device 28 to another consumer's storage device 28.

The grid computing platform 24 manages storage transparently to the consumer. The consumer is aware of the content they currently subscribe to and additional content that they may subscribe to. The location of the content is transparent to the consumer. The consumer does not know and does not need to know if the content is on their local storage device 28 or being pulled from another storage device in the network. In FIG. 4, TV A1 pulls the content out of the resident digital video recorder (DVR) storage device 28 and a network resident storage device 22 while TV A2 displays realtime programming streamed over the network 20. TV B1 pulls content from another consumers DVR storage device 28 while TV C1 pulls programming from a network resident storage device 22. Thus, content may be distributed from a variety of storage devices in a distributed network architecture.

Figure 5:
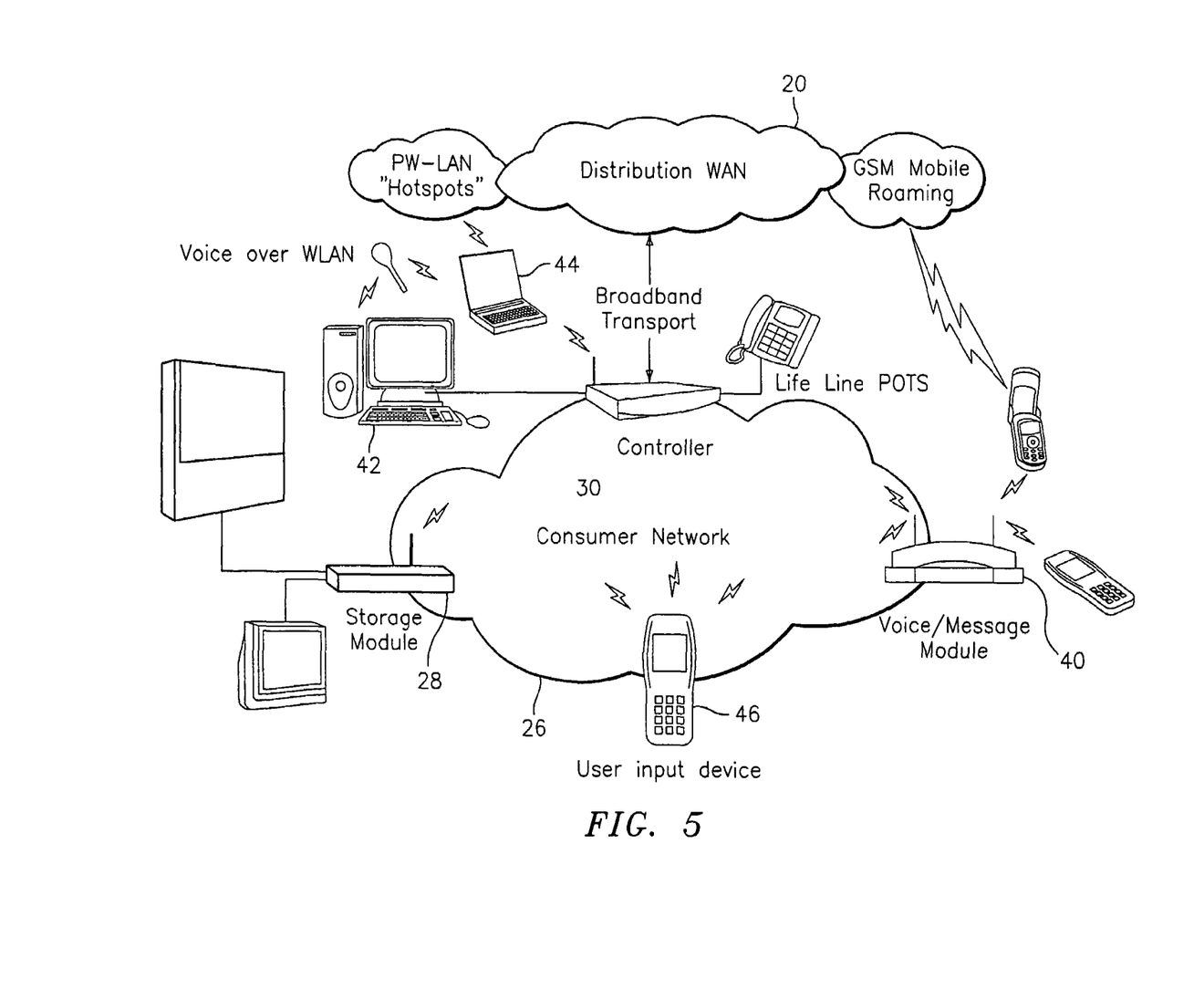
FIG. 5 depicts an exemplary consumer network in embodiments of the invention.

FIG. 5 depicts an exemplary consumer network 26 in an embodiment of the invention. In one embodiment, the consumer network 26 is a residential home network, but similar networks may be employed in any setting where content is distributed. The consumer network 26 may be implemented as a wireless network that connects multiple devices using existing wireless network techniques (e.g., 802.11g/e/i, 802.11b, HPNA, Power Line Carrier, UWB). The controller 30 is coupled to the distribution network and serves as a gateway device between the consumer network 26 and the distribution network 20.

The consumer network 26 includes associated home devices such as: DVR, TV, PC, PDA, game consoles, telephone, etc. Content may be provided through a controller 30 to the consumer's storage device 28. A voice/message module 40 provides for wireless telecommunications services. Voice data may also be distributed to a personal computer 42 or laptop 44. Thus, the consumer network 26 provides communication between devices as well as connecting the storage device 28 back to the distribution network 20 for distributing content to other consumers.

The consumer network 26 depicted in FIG. 5 includes a handheld user input device 46 and associated navigating software to command and control voice, data and video applications. The consumer network 26 has a common control platform for managing devices on the consumer network 26. For example, this includes the ability to navigate through the video programming guide. A simple and functional user interface is one aspect of the content distribution service. This interface promotes watching pre-loaded content thereby reducing the bandwidth across the content distribution network. The interface highlights the breadth of content available on demand to move the consumer away from valuing cable broadcast services based on the number of channels. The consumer selects content through a remote control. In exemplary embodiments of the present invention, the interface provides advanced flexible features such as pause, rewind, and fast forward that are not provided by the broadcasters without a CPE upgrade. The user input device 46 provides such features to guide the consumer through the program guide.

The content distribution system may use a number of techniques to distribute content on the distribution network 20. For example, in order to compensate for reduced upload bandwidth from consumer storage devices 28 to the distribution network 20, content may be stored in sections on several consumer storage devices 28. When content needs to be distributed from the consumers' storage devices to another consumer, only a limited amount is required from each source. Alternatively, rather that store full content on a consumer storage device 28, the first X minutes may be stored to get started, then the rest streamed in for viewing and storage.

Figure 6:
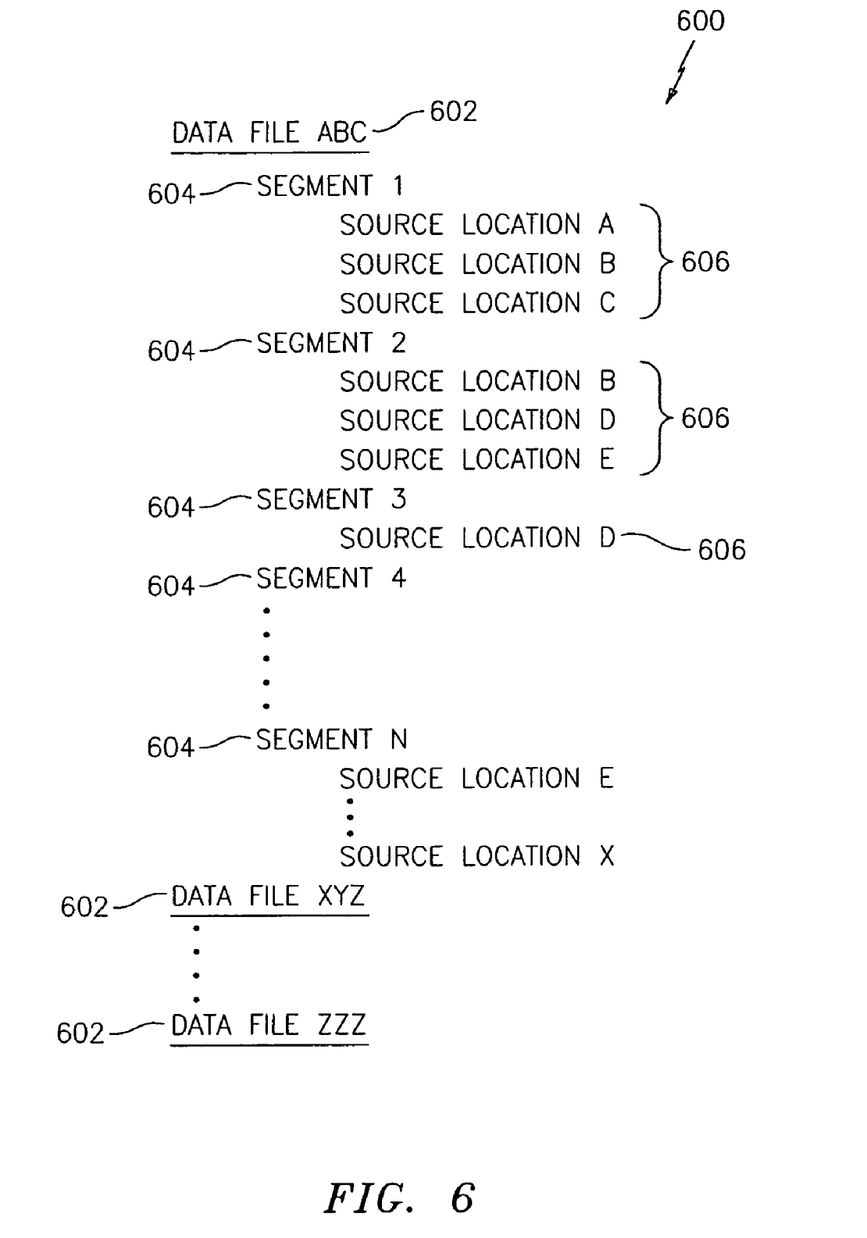
FIG. 6 is a block diagram of directory information that may be utilized in embodiments of the present invention to distribute segmented content across storage devices in a content distribution network.

FIG. 6 is a block diagram of directory information 600 that may be utilized in embodiments of the present invention to distribute segmented content across storage devices accessible via the content distribution network 20. The directory information 600 is accessible by the distribution network 20 and is utilized to track the location of segmented data files so that they may be retrieved and then reassembled on a target device. The directory information 600 may be maintained by one or more processor-based network elements (e.g., processor at a central office) and stored in one or more network storage elements 22. The directory information 600 lists data files 602 and the segment(s) 604 that make up each data file 602. The directory information 600 also includes the source location(s) 606 that contain the data bundles that correspond to each segment 604. For example, data file ABC is broken up into "N" segments 604 (i.e., segment 1, segment 2, segment 3, segment 4, . . . segment N). Segment 1 is currently stored at three source locations 606: source location A, source location B and source location C. Therefore, the software that retrieves the segmented data file ABC may retrieve the data bundle associated with segment 1 from any of these three sources. The source locations 606 may include any of the network storage devices 22 at both centralized locations and storage devices 28 at consumers' sites.

Figure 7:
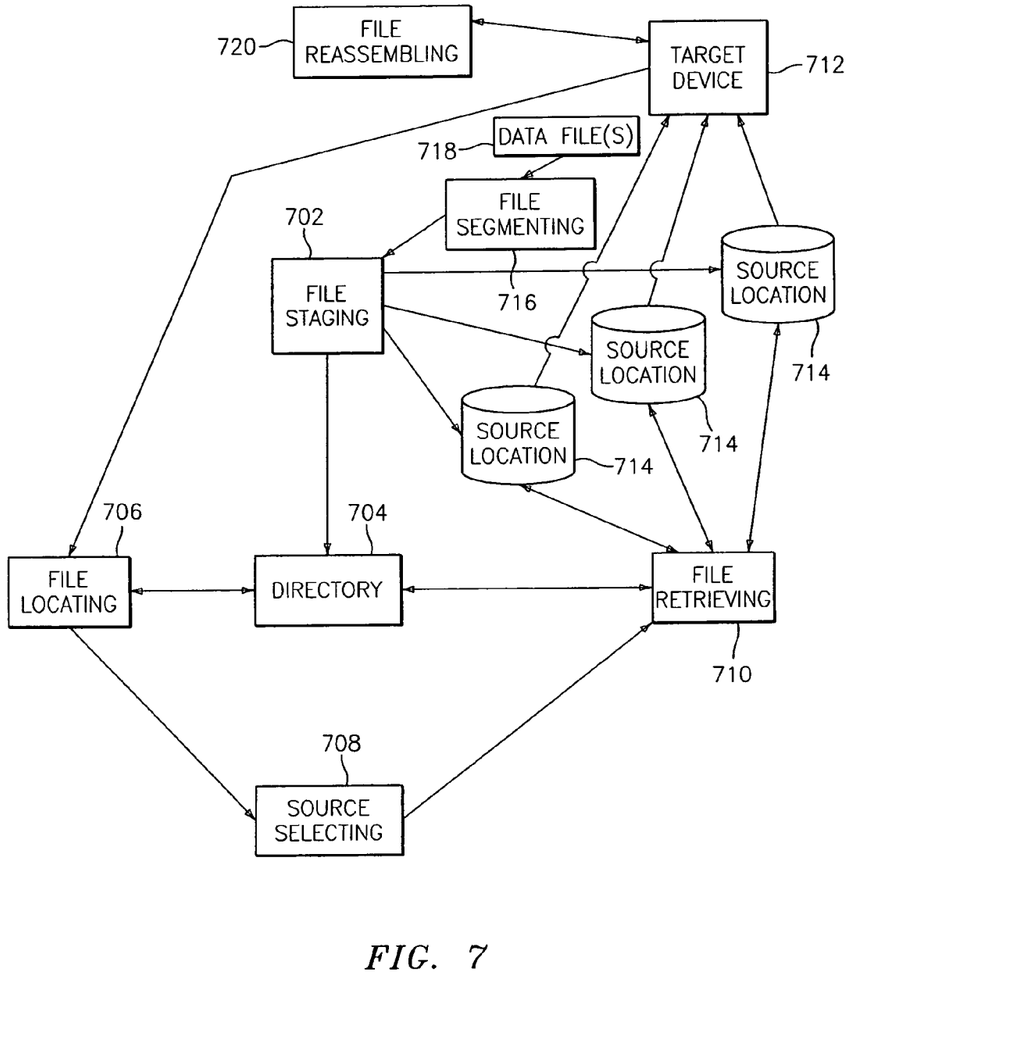
FIG. 7 is a block diagram of processes that may be implemented by the content distribution system to distribute segmented content across the content distribution network in exemplary embodiments of the present invention.

FIG. 7 is a block diagram of processes that may be implemented by the content distribution system to distribute segmented content across the content distribution network 20 in exemplary embodiments of the present invention. FIG. 7 includes a file segmenting process 716 that segments a data file 718 into smaller bundles and then applies a unique identifier tag to each bundle. The file segmenting process 716 feeds the resulting bundles and unique identifier tag into the file staging process 702. The filing staging process stages the bundles to one or more initial source locations 714 and updates the directory 704 with location in information for each bundle. In this manner, the data file 718 is segmented and a bundle associated with each segment is stored in one or more locations.

Also included in FIG. 7 is a file locating process 706 that receives a request from a target device 712 for a particular data file 718. In response to the request for a data file 718, the file locating process 706 queries the directory 704 to get location information for bundles that make up the data file 718. The location information is then sent to a source selecting process 708 to determine which source location(s) 714 should be accessed to retrieve the bundles that make up the data file 718. Considerations that the source selecting process 708 applies may include items such as proximity of bundle to target device 712; available bandwidth between the bundle and the target device 712; other network topology information; and source capabilities.

Still referring to FIG. 7, a file retrieving process 710 pushes or pulls all of the required bundles to the target device 712. In exemplary embodiments of the present invention, the file retrieving process 710 includes updating the directory 704 with the new location of the bundles that make up each segment of the data file 718. This allows the target device 712 to be utilized as a source location 714 for one or more bundles included in the data file 718. The target device 712 accesses a file reassembling process 720 that reassembles the bundles into the original data file 718 and makes the data file 718 available for use by the target device 712.

The file segmenting process 716, file reassembling process 720, file staging process 702, file locating process 706, file retrieving process 710 and source selecting process 708 may be implemented in any manner known in the art including: executing computer code physically located on the target device or on a processor based network element; executing computer code located in the grid computing platform 24 and accessible via the distribution network 20; and executing an intelligent agent accessible via the distribution network 20. Also, processing may be shared between one or more processor based network elements. In addition, the transmitting and receiving described in reference to FIG. 7 may be performed via the distribution network 20 and controlled by the grid computing platform 24.

Figure 8:
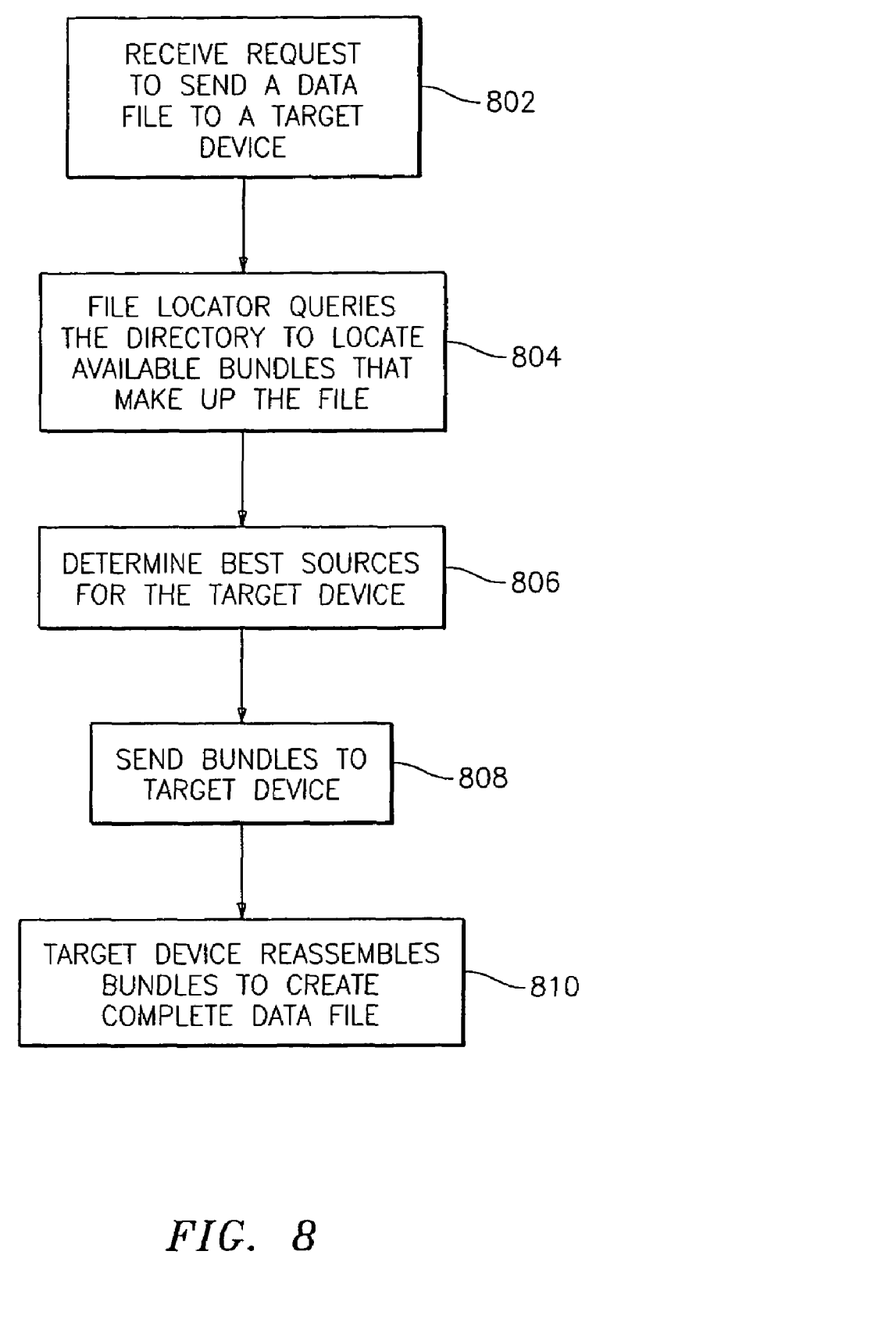
FIG. 8 is a process flow diagram for accessing a segmented data file from a target device utilizing exemplary embodiments of the present invention.

FIG. 8 is a process flow diagram for accessing a segmented data file (i.e., content) from a target device 712 utilizing exemplary embodiments of the present invention. At step 802, a request to send a data file 718 to a target device 712 is received. At step 804, the file locating process 706 is executed to query the directory 704 about the number of segments and corresponding bundles and source locations 714 associated with the data file 718. At step 806, the source selecting process 708 determines which source locations 714 should be utilized to send the bundles associated with each segment of the data file 718 to the target device 712. Next, at step 808, the file retrieving process 710 requests the bundles be sent to the target device 712 from the selected source locations 714. At step 810, the file reassembling process 720 is performed to reassemble the bundles into the complete data file 718. The target device 712 may now utilized the data file 718.

Alternative exemplary embodiments of the present invention may be implemented on any network known in the art to segment data files 718 for delivery to target devices 712. The bundles associated with the data files are located in storage locations that are accessible via the network. These storage locations include customer storage as well as centralized storage systems. The directory 704 may be created and maintained on any systems accessible by target devices 712 via the network. Copies of the directory 704 may be distributed across several locations and implemented on a database system such as a relational database system. The processes described in reference to FIG. 7 may be executed on customer or host computer systems and processing may be distributed across several platforms. Embodiments of the present invention may be extended to any computing platform that requires the ability to distribute large data files among various locations.

The systems and architectures discussed above provide a number of features. Distributed storage is achieved through network storage elements 22 within the distribution network (e.g., at a central office or a data center) and consumer's storage devices 28. These processor-based network elements execute distributed computing processes for determining where and when to store content on a consumer's storage device 28. Factors involved in the geographic-based content distribution include the location of the receiving storage device and network performance on available routes to the receiving storage device.

The content distribution system also provides content management. The distributed network elements manage one content stream as many component streams (e.g., from multiple storage devices) and merge the component streams together to deliver content.

The grid computing platform 24 provides a number of billing options including peer-to-peer distributed billing (e.g., billing consumers for content delivered from other consumers), interactive billing (e.g., pricing change based oil adds watched or interactive adds to ensure they were watched), billing linked to network delivery performance (e.g., QOS such as realtime delivery or store-then-view delivery). The grid computing platform 24 also provides services such as profile management (content profiles, consumer profiles and device profiles). The distributed processing of the grid computing platform also allows installation of additional network elements through plug and play configuration and insertion into the grid.

The distribution network may be a digital subscriber line network (DSL, ADSL, etc.) and provides a number of features. The DSL transmission may be mapped to single carrier modulation (SCM) format. Multiple pair bonding may be used to provide distribution and management. The grid computing platform 24 interacts with the distribution network to modify DSL rate limiting, QOS, etc. The point-to-point nature of DSL may prevent eavesdropping piracy and may be used to track a particular user. Security techniques, such as entering a watermark per user, may be used to track access to content.

Embodiments of the present invention allow a data file (or content) to be broken into segments for storage and retrieval. This may result in less impact on the source machines and allow a data file to be accessed more quickly due to smaller packages being sent to a target device. In addition, bundles associated with segments of the data file may be routed through a network in different paths, minimizing the load on particular paths in the network. Error recovery may be simplified because only the bundles associated with segments that were not received must be resent. Exemplary embodiments of the present invention may be utilized by corporations requiring distribution of large amounts of data across a network, including software companies, audio content providers and video content providers. Exemplary embodiments of the present invention may also be utilized by corporations requiring distribution of small amounts of data across low bandwidth networks, such as wireless providers.

As described above, the present invention can be embodied in the form of computer-implemented processes and apparatuses for practicing those processes. In an exemplary embodiment, the invention is embodied in computer program code executed by the server. The present invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing delivery of a segmented data file comprising:

receiving a request to send the segmented data file to a target device;

querying a directory for one or more segments included in the segmented data file, each of the segments including one or more data bundles, wherein at least one of the one or more segments included in the segmented data file corresponds to a plurality of source storage device locations, the directory lists one or more data files and the one or more segments that make up each data file, and the directory lists source storage device locations containing data bundles that correspond to the at least one of the one or more segments, at least one data bundle being stored on only a single source storage device; and for at least one of the one or more segments:
  determining, from the directory, one or more of the source storage device locations containing a data bundle corresponding to the at least one of the one or more segments;
  selecting one of the source storage device locations for the at least one of the one or more segments, wherein the data bundle is retrievable from any of the determined source storage device locations corresponding to the at least one of the one or more segments; and
  transmitting the data bundle from the selected source storage device location to the target device.

2. The method of claim 1 further comprising updating said directory with pointers to said target device for each said data bundle transmitted to said target device.

3. The method of claim 1 wherein said request is from said target device.

4. The method of claim 1 further comprising retransmitting said data bundle from one of said selected source storage device locations in response to a transmission error.

5. The method of claim 1 further comprising transmitting instructions for reassembling said segmented data file from said data bundles.

6. The method of claim 1 further comprising:
receiving a data file;
segmenting said data file into data bundles;
staging said data bundles to one or more said source storage device locations; and
updating said directory to reflect said data bundles and said source storage device locations for said data file as said segmented data file.

7. The method of claim 1 wherein said selecting is responsive to a network topology.

8. The method of claim 1 wherein said selecting is responsive to capabilities at said one or more source storage device locations.

9. The method of claim 1 wherein said segmented data file includes one or more of a software package, a software patch and a software upgrade.

10. The method of claim 1 wherein said segmented data file includes one or more of audio and video.

11. The method of claim 1 wherein said target device is a personal computer.

12. The method of claim 1 wherein said target device includes a video server.

13. The method of claim 1 wherein said target device includes an audio server.

14. The method of claim 1 wherein said target device is a hand held device with storage capability including one or more of a telephone, a personal digital assistant and an audio player.

15. The method of claim 1 wherein said target device is any device capable of storing said segmented data file.

16. A system for providing delivery of a segmented data file comprising:
the segmented data file accessible via a network, the segmented data file including one or more data bundles;
a directory accessible via the network;
a target device in communication with the network; and
a network element in communication with the network including instructions to implement a method including:
  receiving a request via the network to send the segmented data file to the target device;
  querying the directory via the network for one or more segments included in the segmented data file, wherein at least one of the one or more segments included in the segmented data file corresponds to a plurality of source storage device locations, the directory lists one or more data files and the one or more segments that make up each data file, and the directory lists source storage device locations containing data bundles that correspond to the at least one of the one or more segments, at least one data bundle being stored on only a single source storage device,
  for at least one of the one or more segments:
    determining, from the directory, one or more of the source storage device locations containing a data bundle corresponding to the at least one of the one or more segments;
    selecting one of the source storage device locations for the at least one of the one or more segments, wherein the data bundle is retrievable from any of the determined source storage device locations corresponding to the at least one of the one or more segments; and
    transmitting the data bundle via the network from the selected source storage device location to the target device.

17. The system of claim 16 wherein said network includes a wireless network.

18. The system of claim 16 wherein said network includes the Internet.

19. The system of claim 16 wherein said network includes a broadband network.

20. The system of claim 16 wherein said network is any network capable of transmitting data from one location to another location.

21. A computer program product for providing delivery of a segmented data file, the computer program product comprising:
a storage medium readable by a processing circuit and storing instructions for execution by the processing circuit for performing a method comprising:
  receiving a request to send the segmented data file to a target device, each of the segments including one or more data bundles;
  querying a directory for one or more segments included in the segmented data file, wherein at least one of the one or more segments included in the segmented data file corresponds to a plurality of source storage device locations, the directory lists one or more data files and the one or more segments that make up each data file, and the directory lists source storage device locations containing data bundles that correspond to the at least one of the one or more segments, at least one data bundle being stored on only a single source storage device; and
  for at least one of the one or more segments:
    determining, from the directory, one or more of the source storage device locations containing a data bundle corresponding to the at least one of the one or more segments;
    selecting one of the source storage device locations for the at least one of the one or more segments, wherein the data bundle is retrievable from any of the determined source storage device locations corresponding to the at least one of the one or more segments; and
    transmitting the data bundle from the selected source storage device location to the target device.

* * * * *